United States Patent

[11] 3,628,880

| [72] | Inventors | Robert J. Smuland<br>Cincinnati;<br>Ned A. Hope, Loveland; James E.<br>Sidenstick, Cincinnati, all of Ohio |
|---|---|---|
| [21] | Appl. No. | 881,254 |
| [22] | Filed | Dec. 1, 1969 |
| [45] | Patented | Dec. 21, 1971 |
| [73] | Assignee | General Electric Company |

[54] VANE ASSEMBLY AND TEMPERATURE CONTROL ARRANGEMENT
8 Claims, 4 Drawing Figs.

[52] U.S. Cl. .................................................. 415/115,
416/97, 415/216
[51] Int. Cl. .......................................................F01d 25/12,
F01d 5/08
[50] Field of Search ........................................... 415/115,
116, 117, 175, 216; 416/90, 91, 92, 96, 97

[56] References Cited
UNITED STATES PATENTS
3,527,543  9/1970  Howald ........................ 416/90

3,373,970  3/1968  Brockmann ................... 416/92
FOREIGN PATENTS
787,666  12/1957  Great Britain ................ 415/115

*Primary Examiner*—Henry F. Raduazo
*Attorneys*—Derek P. Lawrence, Erwin F. Berrier, Jr., Lee H. Sachs, Frank L. Neuhauser, Oscar B. Waddell and Joseph B. Forman ABSTRACT: A gas turbine engine vane assembly of the type adapted for use in an annular row of such assemblies and having spaced inner and outer platform portions for defining an annular hot gas stream flow path and a hollow airfoil extending therebetween. The airfoil is compartmentalized by a bridge member extending between the airfoil sidewalls and an impingement insert is provided for each compartment. Chordwise extending structural ribs are provided internally of the airfoil to strengthen the sidewalls and impingement baffles are provided outwardly of the platform portions for temperature control of these elements. Passageways are provided through the platforms to direct coolant to the downstream edges thereof and into the hot gas stream at an angle approximating the hot gas swirl angle.

3,628,880
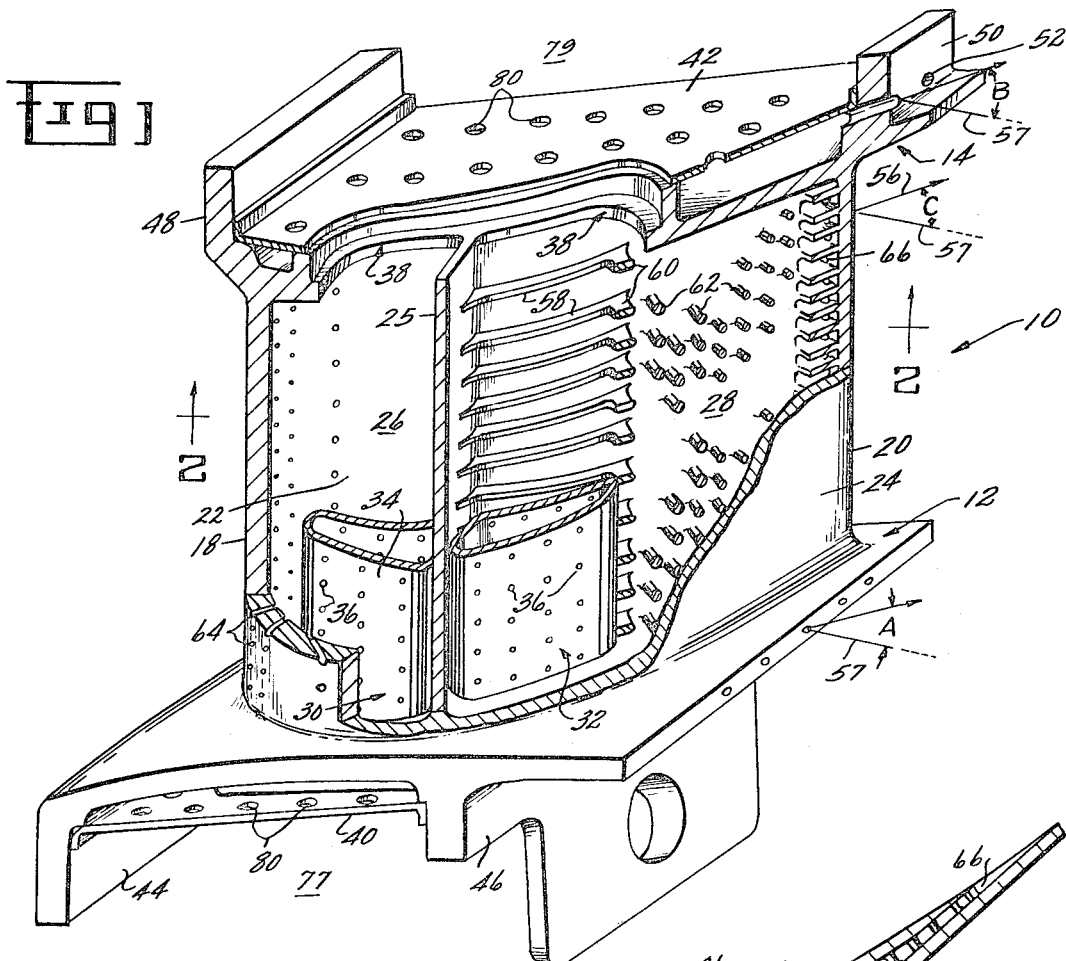
Fig 1
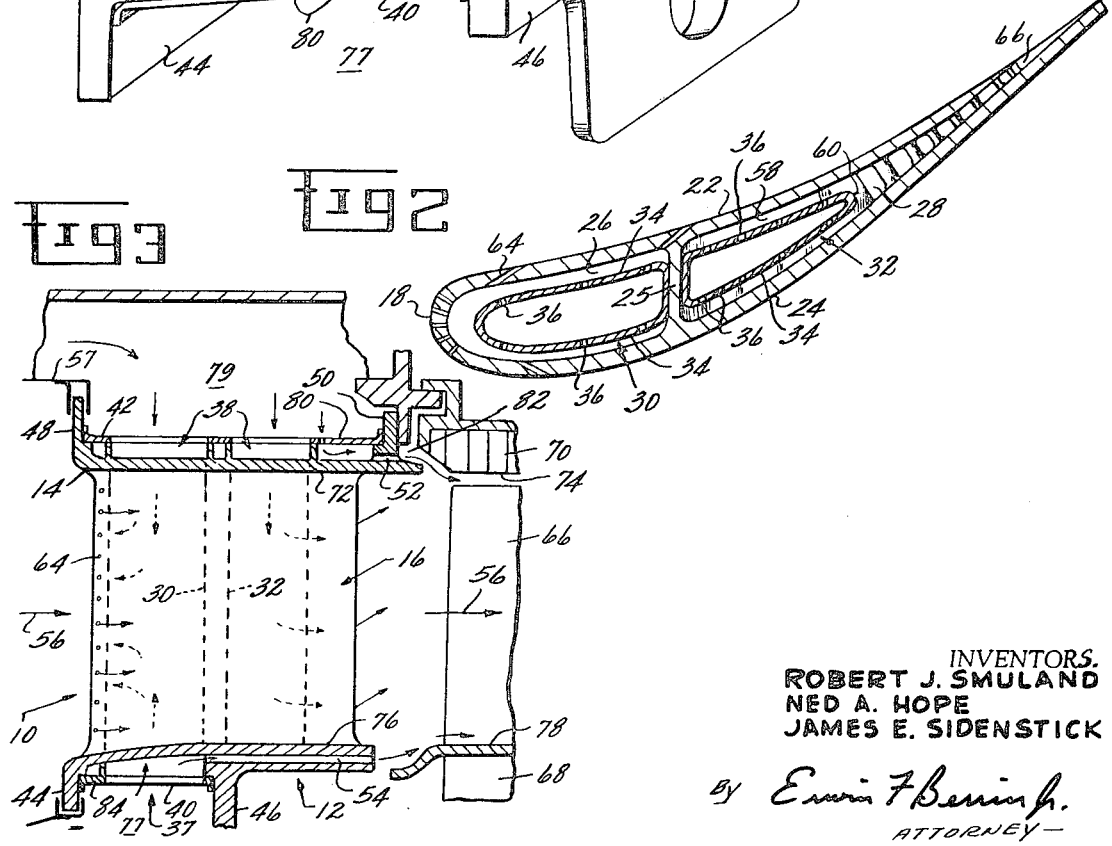
Fig 2
Fig 3
INVENTORS.
ROBERT J. SMULAND
NED A. HOPE
JAMES E. SIDENSTICK
By Erwin F. Berrin Jr.
ATTORNEY

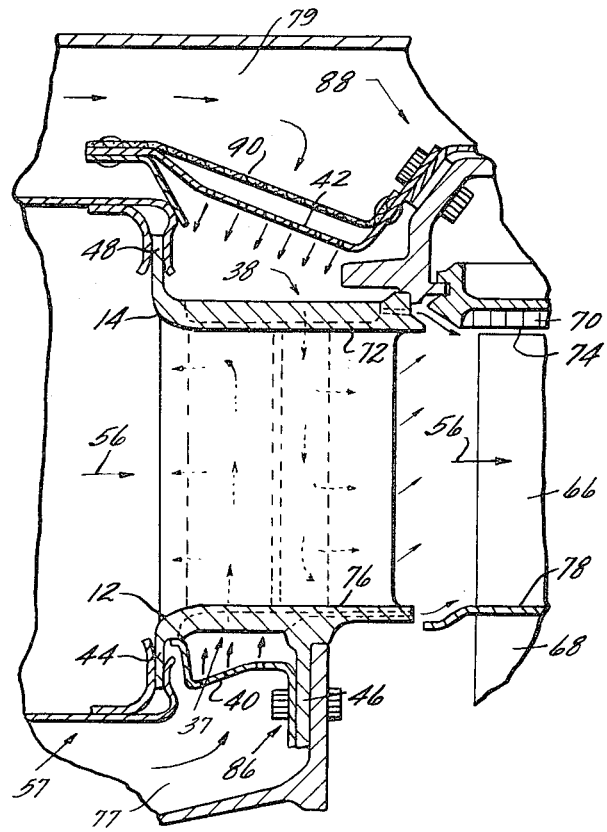

VANE ASSEMBLY AND TEMPERATURE CONTROL ARRANGEMENT

This invention relates to gas turbine engines and, more particularly, to an improved vane assembly and temperature control arrangement for use therein.

It is well-known that the efficiency of a gas turbine engine is related to the operating temperature of the turbine and that engine efficiency may be increased, in theory, by increasing the operating temperature. As a practical matter, however, the maximum turbine operating temperature is generally limited by the high-temperature capabilities of the various turbine elements, with the turbine blades or vanes usually being the most limiting of such elements.

To extend the upper operating temperature of the turbine and, hence, make available some of the theoretical efficiency increase, various designs for hollow vane assemblies adapted to internally receive relatively cool air discharged or extracted from the compressor have been devised. With such arrangements, however, since the use of compressor-pressurized air represents a charge against or is in and of itself subtractive from engine efficiency, it is important that the heat transfer properties of the vane assembly be such as to minimize the amount of coolant required.

A further problem encountered with such vane assembly designs is the tendency of the sidewalls to balloon outwardly and crack due to the pressure differential thereacross.

A primary object of this invention is a lightweight hollow vane assembly having improved resistance to ballooning.

Another object of this invention is a vane assembly having improved heat transfer and temperature control properties.

A further object of this invention is a temperature control arrangement for a turbine which is adapted to efficiently utilize a coolant to maintain low-operating temperatures in various turbine elements.

Briefly stated, the above and other objects, which will become apparent upon reading the following description of the preferred embodiment, are achieved in the present invention by providing a vane assembly of the type adapted to be assembled in an annular row of such assemblies and having a hollow airfoil portion extending generally radially across a hot gas stream and between spaced platform portions. The hollow airfoil portion sidewalls are formed with chordwise extending structural ribs which project internally of the airfoil. High heat transfer rates between a coolant, generally derived from the engine compressor, and the airfoil are achieved, in part, by providing at least one tubular insert adapted to receive and impinge the coolant against the airfoil sidewalls as a plurality of high-velocity jets. Preferably, the airfoil portion includes a bridge member extending between the sidewalls internally of the airfoil so as to define discrete leading and trailing edge chambers with each chamber having a tubular insert.

Means are provided, which may be carried by the vane assembly or by associated engine support structure, for impinging the coolant against the platform portions of each vane assembly so as to effect high rates of heat transfer therebetween. For additional cooling of the vane assembly platform portions as well as film cooling of downstream turbine elements, passageways are provided through the platform portions to direct coolant to the downstream edge of the platforms and into the hot gas stream.

While the specification concludes with claims particularly pointing out and distinctly claiming the subject matter of the invention, it is believed that the invention will be better understood upon reading the following description of the preferred embodiments in connection with the accompanying drawings wherein:

FIG. 1 is a perspective view, in partial section, showing an exemplary embodiment of the improved vane assembly of this invention;

FIG. 2 is a cross-sectional view taken along lines 2—2 of FIG. 1;

FIG. 3 is a partial cross-sectional view of a gas turbine engine turbine employing the vane assembly of FIG. 1 and the temperature control arrangement of this invention; and FIG. 4 is a partial cross-sectional view of a gas turbine engine turbine showing yet another embodiment of the vane assembly and temperature control arrangement of this invention.

Like reference numerals will be used to identify like parts in the following description of the preferred embodiments.

Referring now to the drawings and particularly to FIG. 1, a hollow, air-cooled vane assembly of the type adapted to be assembled in an annular row of such assemblies has been shown at 10 as including inner and outer platform portions 12 and 14, respectively, which are interconnected by at least one generally radially extending airfoil portion 16. The airfoil portion 16 includes chordwise spaced leading and trailing edge portions 18 and 20, and interconnecting concave and convex sidewalls 22 and 24. A bridge or wall member 25 extends between sidewalls 22 and 24 internally of the airfoil portion 16, so as to define discrete leading and trailing edge chambers 26 and 28, respectively. Hollow tubular inserts 30 and 32, having sidewalls 34 generally conforming to the shape of the airfoil sidewalls 22 and 24, as best shown in FIG. 2, are suitably secured within the leading and trailing edge chambers with their walls 34 in close-spaced relationship with the airfoil sidewalls. Each insert is formed with a plurality of apertures 36 adapted to impinge a coolant, such as fluid derived or extracted from a gas turbine engine compressor, against the leading edge portion 18 and the airfoil sidewalls 22 and 24 as a plurality of relatively high velocity jets so as to generate a high heat transfer rate therebetween.

To provide effective cooling for the inner and outer platform portions 12 and 14, means are provided, taking the form of inner and outer impingement baffles 40 and 42, for directing the coolant against the inner and outer platform portions 12 and 14 as a plurality of high-velocity jets so as to generate a high rate of heat transfer therebetween.

As best shown in FIGS. 1 and 3, passage means 37 are provided through the inner platform 12 and the inner impingement baffle 40 for delivery of the coolant to the leading edge insert 30, and passage means 38 are provided through the outer platform 14 and the outer impingement baffle 42 for delivery of the coolant to both the leading edge insert 30 and the trailing edge insert 32.

The inner impingement baffle 40, as shown in FIGS. 1 and 3, extends between radially inwardly extending platform flanges 44 and 46 and is secured thereto by welding, brazing or other suitable joining means. Likewise, the impingement baffle 42 extends between and is suitably secured to radially outwardly projecting flanges 48 and 50 which are formed integrally with the outer platform portion 14.

With continued reference to FIGS. 1 and 3, the downstream flange 50 of the outer platform 14 is formed with a plurality of passageways 52 for directing the coolant which has been impinged on the outer platform 14 to the downstream edge of the outer platform as indicated by the flow arrows of FIG. 3. In a similar manner, the inner platform 12 is formed with a plurality of passageways 54 for directing the fluid which has been impinged on the inner platform 12 to its downstream edge. As will be understood, in operation the vane assemblies 10 are adapted to direct a motive fluid or hot gas stream 56 from a source, such as a combustor 57, to a row of turbine blades 66 and impart a predetermined swirl angle C (as measured from an axial plane including lines 57 of FIG. 1). To minimize mixing and momentum losses within the hot gas stream 56 which detract from turbine efficiency, the passageways 52 are preferably angled relative to said axial plane so that the coolant efflux from such passageways enters the hot gas stream 56 at a predetermined angle A which approximates the hot gas swirl angle C. Likewise, the passageways 54 are preferably formed so as to efflux the coolant to the hot gas stream 56 at a predetermined angle B which approximates the hot gas swirl angle C.

While the coolant efflux angles A and B of passageways 54 and 52 are preferably made equal to swirl angle C, they may be less. For example, it has been found that with a swirl angle C of approximately 73°, an efflux angle B of approximately 65° and an efflux angle A of approximately 55° provide satisfactory results due to considerations of cooling effectiveness during transit of the coolant through the passageways, manufacturability and subsequent use of the effluxed coolant as a film as will be hereinafter discussed.

With reference now to FIG. 2, the trailing edge chamber portion of the airfoil assembly has been shown as including a plurality of longitudinally spaced structural ribs 58 which project inwardly from the sidewalls 22, 24 and extend from the bridge or wall member 25 to a point downstream of the insert 32 where opposed ones of said ribs are interconnected, as at 60, so as to form, in cooperation with the bridge 25 and sidewalls 22, 24, a rigid but lightweight ribbed box structure about the insert 32. Such a ribbed box structure has been found to be highly effective in reducing the stresses within and hence ballooning and cracking of, the sidewalls 22, 24 due to pressure differentials between the coolant and the hot gas stream without interfering with or reducing the effectiveness of the impingement cooling of sidewalls 22, 24.

To further strengthen the airfoil assembly 10 in the trailing edge chamber region as well as improve the temperature control properties of the assembly, a plurality of pin fins 62 may be provided downstream of the insert 32, each of which extends between and is joined to sidewalls 22 and 24.

A plurality of film-cooling passageways 64 may be formed through the leading edge portion 18 and sidewalls 22 and 24 in a well-known manner to provide for continuous coolant flow through the leading edge chamber 26 and to form a film of the effluxed coolant along the exterior surface of the airfoil portion 16 for further temperature control of the assembly 10. Continuous coolant flow through the trailing edge chamber as well as further cooling of the trailing edge portion 20 is provided by forming a plurality of trailing edge passageways 66.

With reference again to FIG. 3, a portion of a gas turbine engine turbine has been shown wherein the vane assembly 10 is used in an annular row of such assemblies upstream of an annular row of turbine blades 66, each of which extends generally radially from a turbine rotor 68 into close-spaced relationship with shroud means 70. As will be understood, the path of the hot gas stream 56 through the turbine of FIG. 3 is generally annular and defined, in part, by an inner surface 72 of the vane assembly outer platform portion 14, an inner surface 74 of the shroud means 70, an inner surface 76 of the vane assembly inner platform 12, and a blade platform portion 78.

In operation, a suitable coolant, such as fluid extracted or derived from a gas turbine engine compressor, is delivered by suitable passage means such as at 77 and 79 of FIGS. 3 and 4, to the impingement baffles 40 and 42. A portion of the coolant from passage 79 passes through apertures 80 in baffle 40, is impinged against the outer surface of the outer platform portion 14 and hence flows through passageways 52 to the hot gas stream 56. A further portion of the coolant is directed into inserts 30, 32 through passage means 38. By exhausting a portion of the coolant through passages 52 to the hot gas stream 56 as generally shown by the flow arrows in FIG. 3, high-temperature gases from the stream 56 are prevented from entering the space 82 between the outer platform portion 14 and the adjacent shroud means 70 and, additionally, a film of such coolant is established along the inner surface 74 of the shroud means 70 so as to improve the temperature control of this element.

In a similar manner, a portion of the coolant from passage 77 flows through apertures 80, is impinged against the inner platform portion 12 and then flows through passageways 54 to the hot gas stream 56 so as to provide further cooling to the downstream portion of platform 12 and establish a protective film of coolant along blade platform 78. At the same time, a further portion of coolant from passage 77 is delivered through passage means 37 to the insert 30.

As best shown in FIG. 3, the coolant within the leading edge insert 30 is impinged against the leading edge portion and the sidewalls 22 and 24 of the airfoil portion 16 provide uniform and efficient temperature control of those surfaces. Additional temperature control is provided by effluxing the coolant through passages 64 which are adapted to establish a film of coolant along the exterior surface of the airfoil. In like manner, the coolant within the downstream inserts 32 is impinged against sidewalls 22 and 24 so as to effect a high rate of heat transfer therebetween. The impinged coolant then flows axially rearwardly through the spanwise chambers defined intermediate the structural ribs 58, around pin fins 62 and hence is exhausted to the hot gas stream through trailing edge passages 66.

Referring now to FIG. 4, a further embodiment of the airfoil assembly and temperature control arrangement of this invention has been shown wherein the impingement baffles 40 and 42 are spaced outwardly of their respective platform portions 12 and 14 and are suitably secured to engine-supporting structure as at 86 and 88, respectively. Additionally, it will be noted that in the embodiment of FIG. 4, the leading edge insert 30 communicates exclusively with the coolant passing through impingement baffle 40 through suitable passage means, as at 37 in FIG. 3, while the downstream insert 32 communicates exclusively with the coolant passing through the outer impingement baffle 42.

In the embodiment of FIG. 4, a screen 90 is provided outwardly of impingement baffle 42 to filter out particulate matter which might clog apertures 36 or passages 64 so as to enhance the overall reliability and effectiveness of the cooling arrangement. In operation, coolant from passage 79 flows through screen 90, through apertures 80 of baffle 42, and is impinged against the outer surface of outer platform portion 14. As shown by the flow arrows in FIG. 4, a portion of the impinged coolant is then directed into the downstream airflow insert 32 and a portion is directed through the passage means 52 to the hot gas stream 56 as previously described in connection with the embodiment of FIG. 1. In a similar manner, coolant from passage 77 is impinged against the inner surface of the inner platform portion 12 by baffle 40 and a portion of such impinged fluid is then directed into trailing insert 32 while the remaining portion passes through the passageways 54 to the downstream edge of the inner platform portion 12 as previously described in connection with the embodiment of FIG. 1.

While several embodiments of the vane assembly and turbine temperature control arrangement of this invention have been depicted and described, it will be appreciated by those skill in the art that many variations and modifications may be made thereto without departing from the fundamental theme of the invention.

What is claimed is:

1. In a vane assembly including a hollow airfoil adapted to project across a hot gas stream and having chordwise spaced leading and trailing edge portions interconnected by concave and convex sidewalls, means disposed internally of said airfoil for receiving a flow of coolant and impinging said coolant against a portion of the inner surfaces of said sidewalls, the improvement comprising:

a bridge member extending between said sidewalls internally of said airfoil structure, said coolant-receiving and impingement means comprising a first perforated tubular insert having sidewalls generally conforming to the contour of said airfoil sidewalls, a plurality of longitudinally spaced chordwise extending structural ribs projecting from the sidewalls internally of said airfoil and extending from said bridge member with opposed ones of said ribs being joined downstream of said first insert to form, in cooperation with said bridge member, a rigid box structure around said insert.

2. The improved vane assembly of claim 1 further characterized in that said ribs project into abutment with said insert so as to establish the desired spacing between said insert and said airfoil sidewalls.

3. The improved vane assembly of claim 1 further characterized in that said bridge member compartmentalizes said airfoil into discrete leading and trailing edge chambers, said first insert disposed in said trailing edge chamber.

4. The improved vane assembly of claim 3 further characterized in that said receiving and impingement means further includes a second perforated tubular insert disposed in said leading edge chamber.

5. In a gas turbine engine of the type having a turbine including an annular row of vane assemblies, each said vane assembly including spaced inner and outer platform portions for defining, respectively, a portion of the inner and outer boundary of a hot gas stream, and at least one hollow airfoil portion extending generally radially between said platform portions, shroud means for defining a portion of the outer boundary of said hot gas stream downstream of said vane assemblies, at least one annular row of turbine blades downstream of said vane assemblies, said blades extending generally radially from a turbine rotor into close-spaced relationship with said shroud means, each said blade including a platform portion for defining the inner boundary of said hot gas stream across said blades, and a source of coolant adjacent said inner and outer vane platform portions, improved means for controlling the temperature of said turbine comprising:

means spaced from said inner and outer vane platform portions for impinging said coolant against said platform portions as a plurality of high-velocity jets to establish a high rate of heat transfer therebetween, at least one tubular insert disposed within each said airfoil portion, passage means formed through at least one said vane platform portion for delivery of coolant internally of said tubular insert, said insert having sidewalls generally conforming to and spaced from the sidewalls of said airfoil portion and formed with a plurality of apertures for impinging said coolant against said airfoil sidewalls as a plurality of high-velocity jets so as to generate a high rate of heat transfer therebetween, and a plurality of passageways formed through said airfoil portion for effluxing coolant from said airfoil portion to establish a continuous flow of coolant therethrough, and a plurality of passageways formed through said inner and outer vane platform portions for directing impinged coolant to the downstream edge of said platform portions so as to provide a film of coolant along said shroud means and said blade platform portions.

6. The improved gas turbine engine of claim 5 further characterized in that said vane assemblies are adapted to impart a predetermined swirl angle to said hot gas stream, said vane platform passageways angled so as to efflux said coolant at an angle approximating said hot gas stream swirl angle whereby mixing and momentum losses within said hot gas stream are greatly reduced.

7. The improved turbomachine of claim 5 further characterized in that each said airfoil portion includes chordwise spaced leading and trailing edge portions and concave and convex sidewalls extending therebetween, a bridge member extending between said airfoil sidewalls internally of said airfoil portion and defining discrete leading and trailing edge chambers with one said tubular insert disposed within each said airfoil chamber, and passage means formed through at least one of said platform portions for delivery of coolant to said inserts.

8. The improved turbomachine of claim 7 further characterized in that passage means are formed through said inner platform portion for delivery of impinged coolant to the leading edge insert and passage means are formed through said outer platform portion for delivery of impinged coolant to the trailing edge insert.

* * * * *